United States Patent
Doornbos et al.

(10) Patent No.: US 6,910,557 B2
(45) Date of Patent: Jun. 28, 2005

(54) SLIDE DAMPER WITH SPRING ASSIST

(75) Inventors: David A. Doornbos, Manteno, IL (US); Steven L. Bivens, Kankakee, IL (US)

(73) Assignee: Illinois Tool Works Inc., Glenview, IL (US)

(*) Notice: Subject to any disclaimer, the term of this patent is extended or adjusted under 35 U.S.C. 154(b) by 136 days.

(21) Appl. No.: 10/353,906

(22) Filed: Jan. 29, 2003

(65) Prior Publication Data

US 2004/0144604 A1 Jul. 29, 2004

(51) Int. Cl.[7] .............................................. F16D 57/00
(52) U.S. Cl. .................................. 188/290; 312/319.1
(58) Field of Search ............................... 188/290, 291, 188/293, 294, 295, 82.1; 312/319.1

(56) References Cited

U.S. PATENT DOCUMENTS

| | | | | |
|---|---|---|---|---|
| 4,586,761 A | * | 5/1986 | Shimbara | 312/319.1 |
| 4,828,344 A | * | 5/1989 | Omata | 312/319.1 |
| 4,872,239 A | * | 10/1989 | Ferguson et al. | 16/64 |
| 6,398,327 B1 | * | 6/2002 | Momoze | 312/319.1 |
| 6,408,483 B1 | * | 6/2002 | Salice | 16/85 |
| 6,499,818 B2 | * | 12/2002 | Brustle | 312/319.1 |
| 6,591,454 B2 | * | 7/2003 | Brustle | 16/374 |
| 6,666,306 B2 | * | 12/2003 | Gasser | 188/82.1 |

* cited by examiner

Primary Examiner—Robert A. Siconolfi
(74) Attorney, Agent, or Firm—Mark W. Croll; Paul F. Donovan

(57) ABSTRACT

A slide damper for use with an associated sliding object that is movable between a first position and a second position provides an assisted, dampened return. The slide damper includes a housing having a track, a gear on the housing and a cover configured for movement along the housing. The cover further includes a track engaging pin for engaging the housing track as the cover moves along the housing. A biasing element operably connects the cover and the housing to bias the cover to the second position. A damper assembly is disposed within the cover and includes a damper housing having a geared outer periphery, a damping material disposed in the damper housing and a rotor disposed at least in part within the damper housing for cooperating with the damping material. The rotor has a shaft and is rotatable relative to the damper housing. The rotor shaft extends through the cover and a damper gear operably connects the shaft and the housing gear. The damper assembly is selectively engaged in which the rotor rotates relative to the damper housing when the cover is moved toward the second position and movement of the damper gear along the housing gear is dampened, and disengaged in which the rotor is stationary relative to the damper housing when the cover is moved toward the first position and movement of the damper gear along the housing gear is unimpeded.

20 Claims, 3 Drawing Sheets

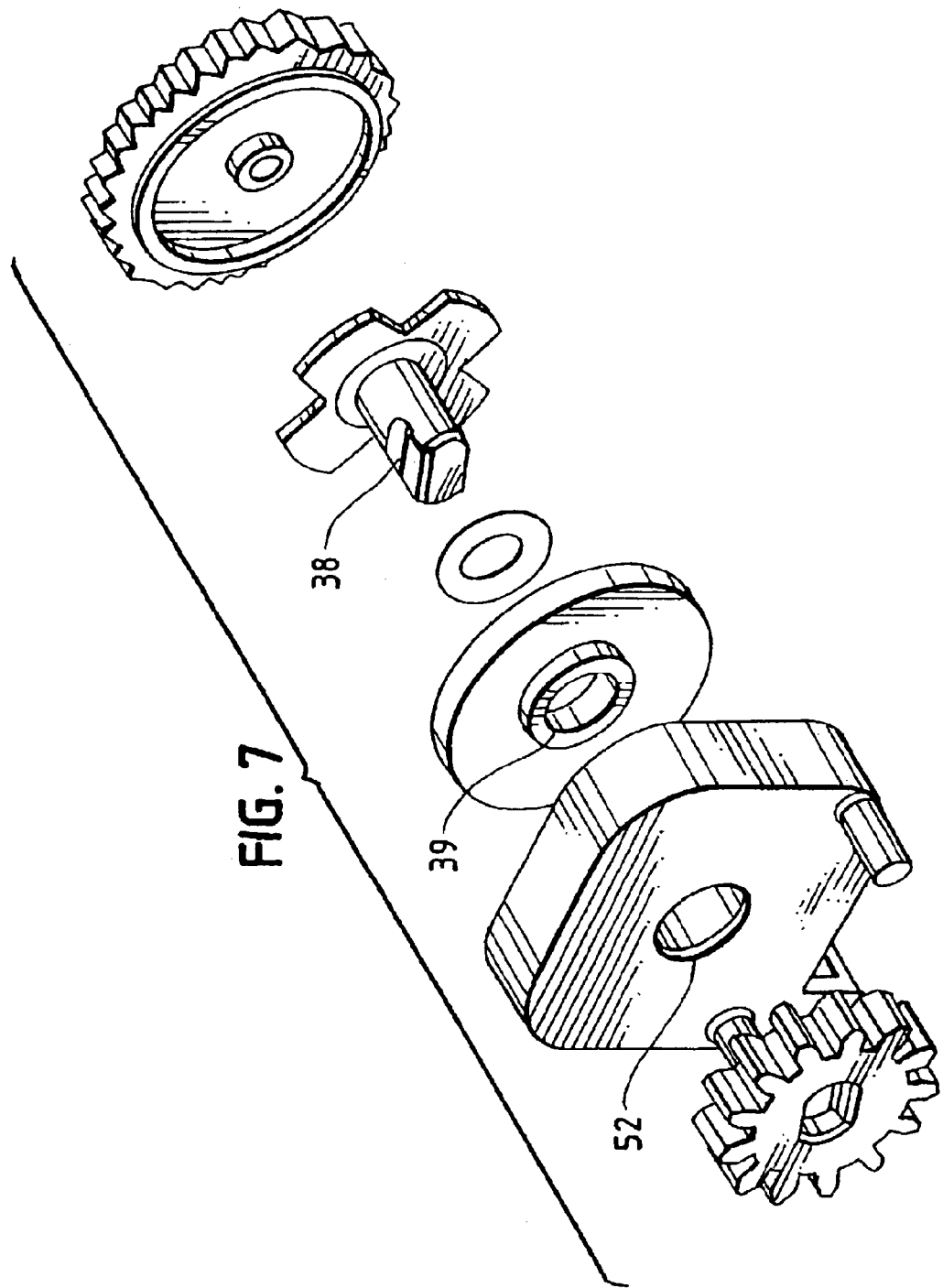

SLIDE DAMPER WITH SPRING ASSIST

BACKGROUND OF THE INVENTION

The present invention relates to slide dampers. More particularly, the present invention relates to slide dampers for use with sliding objects, which slide dampers have a spring assist.

Slides are used in a wide variety of applications. For example, slides may be used in conjunction with drawers, sliding racks, desk drawers, cabinets and the like to slide an object, such as a drawer, from another object, such as the cabinet in which the drawer is installed.

Many such slide arrangements include an assist feature to assist in moving the object one way or the other. That is, a spring can be used to assist in closing a drawer from the open position. In a typical assisted arrangement, a spring is mounted along a rail of the slide assembly to "pull" the drawer closed, after closing action is begun.

With conventional spring assists, the mechanism is self-closing, requiring only an initial start to unseat it from a secured, opened position. Such springs or other assists facilitate reducing the effort required to, for example, close the drawer and to assure that the drawer completely closes.

However, it has been found that an assist of sufficient strength to automatically and fully close a heavily loaded drawer or the like can result in abrupt movements and rapid closing. At times, the "strength" of the assist results in a significant impact upon reaching the fully closed position.

To this end, it has been found desirable to dampen the sliding action of such an object. For example, it may be desirable to dampen the movement of a drawer having an assisted closure when moving in one direction, typically in the closing direction. Such dampened assisted closures may be highly desirable in drawers, such as desk drawers and the like so that the drawer closes more gently.

It may also be desirable to deactivate or circumvent the damping mechanism in the opposite direction, that is, when the drawer is being pulled open. In that the opposite (e.g., opening) motion may be done without mechanical assist, and in fact may itself be restrained by the expansion of an extension spring used to assist closing, further damping is not needed and may be undesirable.

In addition, due to the varying nature of these devices, it is presently unknown to incorporate a spring assist in a single, unitary device with a damping arrangement. In fact, when used in conjunction with one another, known configurations typically employ a spring return on one side of, for example a drawer (at one runner or rail), and a damping mechanism at the other side (along the other runner or rail) of the drawer.

As such, many such spring-assisted and damped arrangements require that components are assembled to both sides of the sliding drawer. Such arrangements can be cumbersome and expensive, and could further be aesthetically unappealing when, for example, the drawer is in the open position.

Accordingly, there exists a need for a self-closing slide mechanism that has a damper operational in the closing direction. Desirably, the damping action such a self-closing slide is not operational in the opening direction of a drawer or the like to which the self-closing slide is connected. More desirably, such a slide damper is compact and minimizes the number of components required for one-way damping operation in a slide.

BRIEF SUMMARY OF THE INVENTION

A slide damper is configured for use with an associated sliding object, such as a drawer, that is movable between a first or open position and a second or closed position. The slide damper is preferably self-closing and has a damping function operational in one direction, such as the closing direction.

The slide damper includes a housing having a track and a linear gear extending generally parallel to the track. A cover is configured for movement along the housing. The cover has a damper assembly receiving region and an out-of-round opening formed therein. The cover also includes a pin for engaging the housing track as the cover moves along the housing and an engaging element for engaging the associated sliding object (e.g., the drawer).

A spring connects the cover and the housing and biases the cover to the closed position. A damper assembly is disposed in the cover and includes a damper housing having a geared outer periphery, a damping material disposed in the damper housing and a rotor disposed at least in part within the damper housing for cooperating with the damping material. The rotor has a shaft and is rotatable relative to the damper housing. The damper is positioned in the cover so that the rotor shaft extends through the cover opening.

The damper assembly is selectively engaged such that the rotor rotates relative to the damper housing when the cover is moved toward the closed position and disengaged such that the rotor is stationary relative to the damper housing (i.e., they rotate together) when the cover is moved toward the open position.

A damper gear operably connects the damper shaft and the housing gear for rotating the damper shaft as the cover is moved along the housing. Movement of the damper gear along the housing gear is dampened when the damper assembly is engaged (i.e., moving toward the closed position) and movement of the damper gear along the housing gear is unimpeded by the damper when the damper is disengaged (i.e., moving toward the open position).

In a present embodiment, the housing track is formed having a main portion and a branch portion depending from the main portion. The main portion and the branch portion are separated from one another by a flexible finger. In this embodiment, the cover track engaging element is movable transverse to the track, at the branch portion by urging against the finger. This facilitates reengaging the drawer and the slide damper in the event that they have separated from one another.

Preferably, the housing track includes a detent formed at an end thereof (opposite that of the finger). In such an arrangement, the cover pin (or one of the pins) engages the detent to secure the cover when the damper and drawer are in the open position.

Engagement and disengagement of the damper (i.e., one-way damping) is provided by the movement of the damper assembly within the cover. In a present embodiment, the cover includes a recessed region in which the damper assembly is disposed. The recessed region includes teeth that engage the damper housing when the damper assembly is moved toward the teeth. The damper housing disengages from the teeth when the damper assembly is moved away from the teeth. Engagement of the damper housing with the cover recessed region teeth prevents the damper housing from rotating. As such movement of the cover necessitates that the rotor rotates within the damping material in the damper housing.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 7 is another perspective view of a portion of the slide damper shown in FIG. 2.

DETAILED DESCRIPTION OF THE INVENTION

Figure 1:
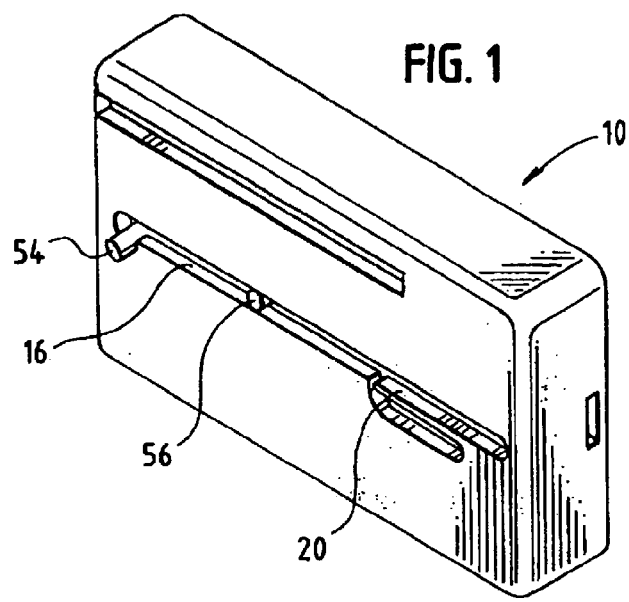
FIG. 1 is a perspective view of the front of the slide damper with spring assist embodying the principles of the present invention, the slide damper illustrated in a loaded (open) position.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular, to FIG. 1, there is shown a slide damper with spring assist 10 embodying the principles of the present invention. The present slide damper 10 uses a spring assist in a compact, integral unit for use in, for example a drawer, such that the damper is engaged and operational when the drawer or the like is moved in one direction, such as pushed closed, but is disengaged and non-operational when the drawer is moved toward the other direction, such as toward an open position.

Figure 2:
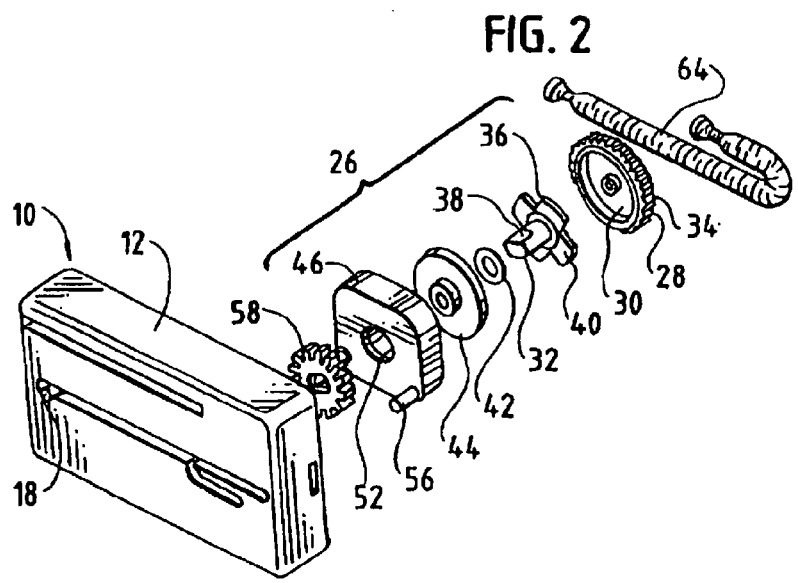
FIG. 2 is an exploded view of the slide damper of FIG. 1.
Figure 5:
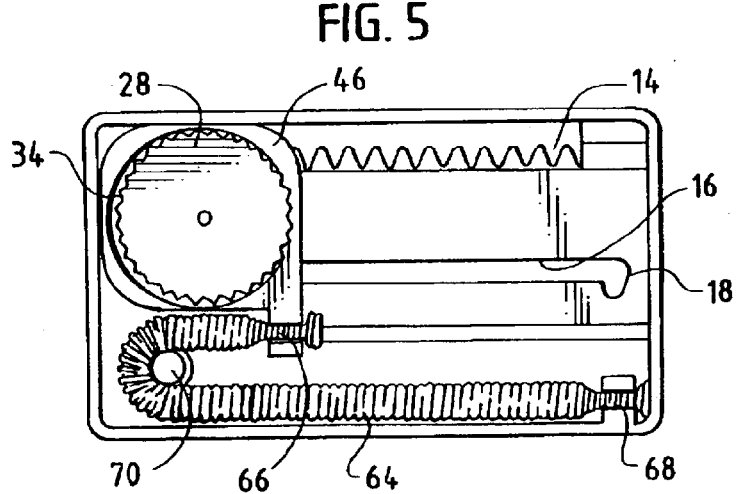
FIG. 5 is a rear view of the slide damper illustrated in the unloaded (closed) position.

Referring to FIG. 2, the slide damper 10 includes a housing 12 for carrying the components thereof. Referring briefly to FIG. 5, a rack gear 14 can be formed integral with the housing 12. Alternately, although not shown, the rack gear can be mounted to the housing. The housing 12 includes an elongated track or slot 16 that extends generally parallel to the rack gear 14. The slot 16 is a through wall slot and includes a detent 18 at an end thereof.

Near an opposing end of the slot 16 (opposite from the detent 18), the slot 16 includes a flexible finger 20 (FIG. 6) that separates a main portion 22 of the slot 16 from a branch portion 24 of the slot 16. The branch slot 24 essentially depends from the main slot 22 and is separated from the main slot by the finger 20. The branch slot 24 angles slightly away from the main slot 22 as it extends therefrom.

Referring again to FIG. 2, the slide damper 10 includes a damper assembly 26 that includes a damper housing 28, a damping material 30 in the housing 28, and a rotor 32 that is positioned, in part, within the housing 28. As seen in FIG. 2, the damper housing 28 includes teeth 34 about the periphery thereof.

The rotor 32 includes a central hub-like portion 36 and a shaft 38 extending from the hub 36. The hub 36 can include arms 40 that are disposed within the damping material 30. As will be appreciated by those skilled in the art, movement of the arms 40 through the damping material 30 is dampened or resisted by the damping material 30.

As configured, the shaft 38 extends outwardly from the hub 36 and damper housing 28. A seal 42 is positioned over the shaft 38 and a damper cap 44 is positioned over the rotor 32 and seal 42 to close (seal) the damper assembly 26. The sealed damper assembly 26 (with the included rotor 32, seal 42 and cap 44), is positioned in a damper cover 46. Rotation of the rotor 32 within (i.e., relative to) the damper housing 28 is dampened due to the presence of the damping material 30 in that the damping material 30 resists rotation of the rotor 32 within the damper housing 28.

Figure 4A:
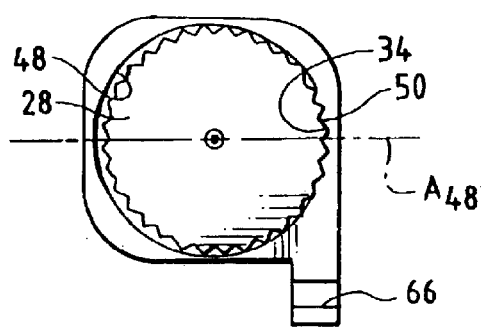
FIGS. 4A and 4B are rear views of the damper housing positioned in the damper cover in the engaged position (FIG. 4A) and the disengaged position (FIG. 4B)
Figure 4B:
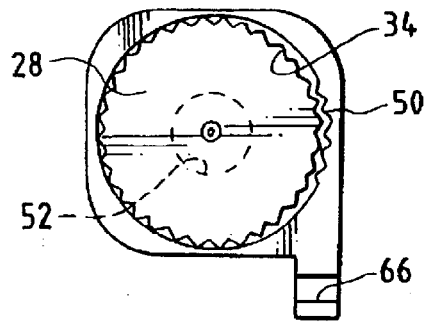

In conjunction with FIGS. 4A and 4B, the cover 46, which traverses back-and-forth along the housing 12, includes an out-of-round recess 48 formed in a rear side thereof that is configured for receiving the damper assembly 26, and specifically, the damper housing 28. In a current embodiment, the recess 48 is oblong and includes an engaging element 50 at an end of the recess 48 (at about the major axis $A_{48}$ of the oblong) for engaging the damper housing 28. In a present embodiment the engaging element 50 is one or more teeth positioned at the end of the recess 48 that engage the teeth 34 on the housing 28. As will be discussed below, engaging the housing teeth 34 with the cover recess teeth 50 engages the damper 26, whereas disengaging the housing teeth 34 from the cover teeth 50 disengages the damper 26.

The cover 46 also includes an out-of-round opening 52 formed therein, within the recessed region 48. The rotor shaft 38 extends through the opening 52, such that the shaft 38 or cap boss 19 (FIG. 7) can move within the opening 52 for moving the housing teeth 34 into and out of engagement with the cover teeth 50.

Figure 3:
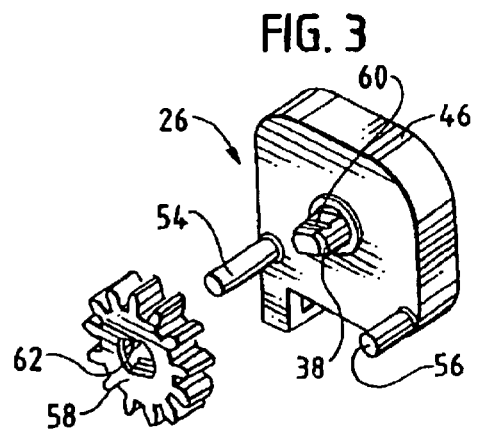
FIG. 3 is a perspective view of the slide damper assembly illustrating the damper gear removed from the assembly cover.
Figure 6:
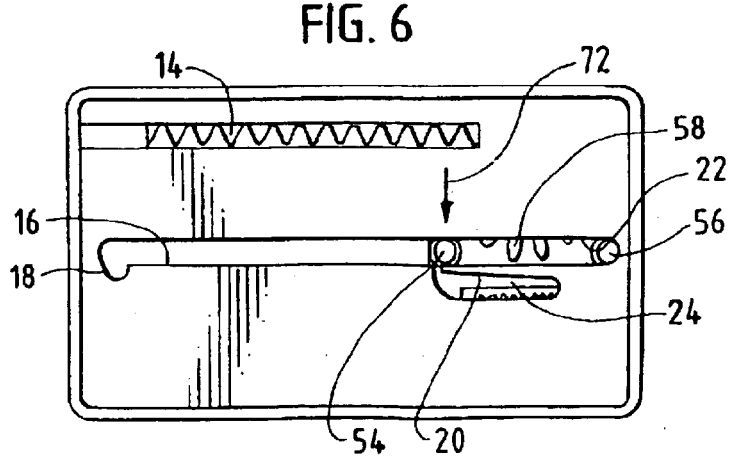
FIG. 6 is a front view of the slide damper in the unloaded position.

The cover 46 further includes one or more pins 54 (FIG. 3), 56 that extend from a side of the cover 46 opposite of the recess 48. The one or more pins 54, 56 are configured for fitting into the housing slot 16 so that the damper assembly 26 (in the cover 46) traverses back-and-forth within the housing 12, with the pins 54, 56 maintaining proper alignment of the damper assembly 26 (and the cover 46) within the housing 12. As seen in FIGS. 1 and 6, as the cover 46 traverses back-and-forth within the housing 12, the pins 54, 56, extending through the slot 16, maintain the cover 46 and damper assembly 26 properly aligned.

A damper gear 58 is fitted to the damper shaft 38 for rotation with the damper 26. In a present embodiment, the shaft 38 is keyed (as indicated at 60, FIG. 3) and fits into a keyed slot 62 in the gear 58 to assure that the gear 58 remains mounted to the shaft 38 and rotates with the shaft 38. As the damper assembly 26 travels with the cover 46 (along the housing 12), the damper gear 58 engages the rack gear 14. This, in turn, rotates the damper 26.

As set forth above, and as will be understood from a study of FIGS. 5 and 6, the damper gear 58 fits into the rack gear 14. As such, the damper assembly 26 moves along with the cover 46 along the rack gear 14. To this end, a spring 64 is mounted, at one end, to the cover 46 and at an opposing end to the housing 12. The spring 64 is fixed to the cover 46 and the housing 12 at retaining or pinching regions 66, 68, respectively, that secure the spring 64 in place.

In order to provide an increased use of the spring 64 in a minimized space, the spring 64 is wrapped around a turning element or post 70 within the housing 12. The post 70 is located at an opposite end of the housing 12 from the housing spring retainer 68, which at the end at which the cover 46 resides when the slide damper 10 is in the closed or unloaded position.

In a typical use, the slide damper 10 is mounted to a drawer slide fixture (not shown), with the one of the pins, such as pin 54, engaging the drawer. With the drawer closed, the spring 64 is relaxed and the slide damper 10 is in the unloaded condition, as seen in FIGS. 5 and 6. As the drawer is pulled open, the cover 46 is urged such that the cover teeth 50 disengage from damper housing teeth 50 (FIG. 4B), thus disengaging the damper 26. The gear 58 is (remains) engaged with the rack gear 14 throughout and thus, in this position, the gear 58, and the damper assembly 26 including the damper housing 28 are permitted to freely rotate, with the gear 58 along the rack gear 14, without damping effect. In addition, as the drawer is pulled open, the spring 64 is tensioned which, in turn, tends to pull the drawer closed.

When the drawer is fully opened, the retaining pin 54 on the cover 46 drops into the housing slot detent 18. This maintains the drawer open even though the spring 64 tension tends to pull the drawer closed. The fully opened position is illustrated in FIG. 1.

When it is desired to return the drawer to the closed position from the open position, it is necessary only to urge the drawer such that the retaining pin 54 is urged from the detent 18. The spring 64 then provides sufficient force to pull the drawer closed. As the drawer is closing, the cover 46 is "pulled" so that the damper housing teeth 34 engage the cover teeth 50 (FIG. 4A). This prevents free-rotation of the damper housing 28. As a result, the damper hub 36 and arms 40 are forced to rotate through the damping material 30. That is, the damper assembly 26 is engaged and rotation of the gear 58 along the rack gear 14 is dampened. This provides a damped or "slower" closing of the drawer, even though the spring 64 tension pulls the drawer closed.

The flexible finger 20 that separates the main slot 22 from the branch slot 24 provides an enhanced feature in the event that the drawer pin 54 (retaining pin) inadvertently separates from the drawer. As will be appreciated from an understanding of the present invention, in the event that the drawer separates from the slide damper 10, the slide damper 10 will return to the unloaded condition by action of the spring 64 return. The unloaded condition is shown in FIG. 6. In that the drawer and slide damper 10 are now separated, the retaining portion of the drawer (not shown), will be lying along the path of, or overlying the retaining (drawer) pin 54. As such, the presence of the pin 54 may interfere with closing the drawer, and, in an inflexible pathway or slot, this could result in damage to the pin, the slot or the drawer retaining portion.

The present flexible finger 20 overcomes this potential damage by providing a flexible pathway or slot portion into which the retaining pin 54 can be urged in order to urge the drawer retaining portion beyond and into engagement with the retaining pin 54. That is, as the drawer retaining portion is passed beyond or onto the retaining pin 54, the pin 54 is urged against the finger 20 toward or into the branch slot 24, as indicated by the arrow at 72. This provide sufficient space to "fit" both the retaining pin 54 and the drawer retaining portion within the same general vertical space. When the pin 54 is then realigned with the drawer retaining portion, the pin 54 will lock into the retaining portion for proper operation of the slide damper 10. As will be appreciated, moving the slide damper 10 toward the loaded position assures that the pin 54 will traverse into the main slot 22. Even if the pin 54 was previously fully urged into the branch slot 24 during reengagement with the drawer, the pin 54 will be returned to the main slot 22.

Although damping has been achieved with other devices, typically additional gears are required with multiple assemblies. Moreover, in conventional devices, a separate spring is required to provide the closing assist feature and, such springs are typically mounted to the drawer visible and on an opposite side from the slide. The present slide damper 10, on the other hand, provides an integral, compact and efficient unit in which a number of advantageous and desirable characteristics are afforded all in a relatively cost effective design. Moreover, because of the integral design, such a slide 10 substantially simplifies the structure required for damping of a spring assisted slide mechanism.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A slide damper for use with an associated sliding object that is movable between a first position and a second position, comprising:
   a housing having a track;
   a gear on the housing;
   a cover configured for movement along the housing, the cover having a recessed region and an opening formed therein, the cover further including a truck engaging element for engaging the housing track as the cover moves along the housing and an engaging element for engaging the associated sliding object;
   a biasing element operably connecting the cover and the housing to bias the cover to the second position;
   a damper assembly disposed within the cover recessed region, the damper assembly including a damper housing having a geared outer periphery, a damping material disposed in the damper housing and a rotatable element disposed at least in part within the damper housing for cooperating with the damping material, the rotatable element having a shaft and being rotatable relative to the damper housing, the rotatable element shaft extending through the cover opening, the damper assembly being selectively engaged in which the rotatable element rotates relative to the damper housing when the cover is moved toward the second position and disengaged in which the rotatable element is stationary relative to the damper housing when the cover is moved toward the first position; and a gear operably connecting the damper shaft and the housing gear for rotating the damper shaft as the cover is moved along the housing, wherein movement of the gear along the housing gear is dampened when the damper assembly is engaged and wherein movement of the gear along the housing gear is unimpeded by the damper when the damper is disengaged.

2. The slide damper in accordance with claim 1 wherein the housing track has a main portion and a branch portion depending from the main portion, and wherein the track engaging element of the cover is movable transverse to the track, at the branch position.

3. A slide damper for use with an associated sliding object that is movable between a first position and a second position, comprising:
  a housing having a track;
  a gear on the housing;
  a cover configured for movement along the housing, the cover having a recessed region and an opening formed therein, the cover further including a track engaging element for engaging the housing track as the cover moves along the housing and an engaging element for engaging the associated sliding object;
  a biasing element operably connecting the cover and the housing to bias the cover to the second posltion;
  a damper assembly disposed within the cover recessed region, the damper assembly including a damper housing having a geared outer periphery, a damping material disposed in the damper housing and a rotatable element disposed at least in part within the damper housing for cooperating with the damping material, the rotatable element having a shaft and being rotataple relative to the damper housing, the rotatable element shaft extending through the cover opening, the damper assembly being selectively engaged in which the rotatable element rotates relative to the damper housing when the cover is moved toward the second position and disengaged in which the rotatable element is stationary relative to the damper housing when the cover is moved toward the first position; and
  a gear operably connecting the damper shaft and the housing gear for rotating the damper shaft as the cover is moved along the housing, wherein movement of the gear along the housing gear is dampened when the damper assembly is engaged and wherein movement of the gear along the housing gear is unimpeded by the damper when the damper is disengaged,
  wherein the housing track has a main portion and a branch portion depending from the main portion, and wherein the track engaging element of the cover is movable transverse to the track, at the branch portion, the track main portion and branch portions being separated by a flexible finger, and wherein transverse movement of the track engaging element is effected by movement against the flexible finger.

4. A slide damper for use with an associated sliding object that is movable between a first position and a second position, comprising:
  a housing having a track;
  a gear on the housing;
  a cover configured for movement along the housing, the cover having a recessed region and an opening formed therein, the cover further including a track engaging element for engaging the housing track as the cover moves along the housing and an engaging element for engaging the associated sliding object;
  a biasing element operably connecting the cover and the housing to bias the cover to the second position;
  a damper assembly disposed within the cover recessed region, the damper assembly including a damper housing having a geared outer periphery, a damping material disposed in the damper housing and a rotatable element disposed at least in part within the damper housing for cooperating with the damping material, the rotatable element having a shaft and being rotatable relative to the damper housing, the rotatable element shaft extending through the cover opening, the damper assembly being selectively engaged in which the rotatable element rotates relative to the damper housing when the cover is moved toward the second position and disengaged in which the rotatable element is stationary relative to the damper housing when the cover is moved toward the first position; and,
  a gear operably connecting the damper shaft and the housing gear for rotating the damper shaft as the cover is moved along the housing, wherein movement of the gear along the housing gear is dampened when the damper assembly is engaged and wherein movement of the gear along the housing gear is unimpeded by the damper when the damper is disengaged, and
  wherein the cover recessed region includes a damper housing engaging element formed therein for cooperation with the damper housing geared outer periphery, and wherein the cover opening is configured for moving the damper shaft or cap boss for engaging the damper housing geared outer periphery with the damper housing engaging element and for disengaging the damper housing geared outer periphery from the damper housing engaging element.

5. The slide damper in accordance with claim 4 wherein the cover opening is oblong and wherein the damper housing engaging element is one or more teeth formed in the cover recessed region configured to engage the damper housing geared outer periphery when the damper is moved toward the one or more recessed region teeth.

6. The slide damper in accordance with claim 1 wherein the housing track includes a detent formed at an end thereof for securing the cover when the damper is in the first position.

7. The slide damper in accordance with claim 6 wherein the cover track engaging element is configured for engagement with the detent to secure the cover when the damper is in the first position.

8. A slide damper for use with an associated sliding object that is movable between a first position and a second position, comprising:
  a housing have a track, the housing track including a detent formed at an end thereof;
  a gear on the housing;
  a cover configured for movement along the housing, the cover having a recessed region and an opening formed therein, the cover further including a track engaging element for engaging the housing track as the cover moves along the housing and an engaging element for engaging the associated sliding object;
  a biasing element operably connecting the cover and the housing to bias the cover to the second position;
  a damper assembly disposed within the cover recessed region, the damper assembly including a damper housing having a geared periphery, a damping material disposed in the damper housing and a rotate element disposed at least in part within the damper housing for cooperating with the damping material, the rotatable element having a shaft and being rotatable relative to the damper housing the rotatable element shaft extending through the cover opening, the damper assembly being selectively engaged in which the rotatable element rotate, relative to the damper housing when the cover is moved toward the second position and disengaged in which the rotatable element is stationary relative to the damper housing when the cover is moved toward the first position;

a gear operably connecting the damper shaft and the housing gear for rotating the damper shaft as the cover is moved along the housing, wherein movement of the gear along the housing gear is dampened when the damper assembly is engaged and wherein movement of the gear along the housing gear is unimpeded by the damper when the damper is disengaged; and two cover track engaging elements, one of the elements being engageable with the detent.

9. The slide damper in accordance with claim 1 wherein the gear on the housing is a linear gear.

10. A slide damper for use with an associated sliding object that is movable between a first position and a second position, comprising:

a housing having a track and including a linear gear extending generally parallel to the track;

a cover configured for movement along the housing, the cover having a damper assembly receiving region and an out-of-round opening formed therein, the cover further including a pin for engaging the housing track as the cover moves along the housing and an engaging element for engaging the associated sliding object;

a spring connecting the cover and the housing to bias the covet to the second position;

a damper assembly including a damper housing having a geared outer periphery, a damping material disposed in the damper housing end a rotor disposed at least in part within the damper housing for cooperating with the damping material, the rotor having a shaft and being rotatable relative to the damper housing, the damper being disposed within the damper assembly receiving region with the rotor shaft or cap boss extending through the cover opening, the damper assembly being selectively engaged such that the rotor rotates relative to the damper housing when the cover is moved toward the second position and disengaged such that the rotor is stationary relative to the damper housing when the cover is moved toward the first position; and a damper gear operably connecting the rotor shaft and the housing gear for rotating the damper shaft as the cover is moved along the housing, wherein movement of the damper gear along the housing gear is dampened when the damper assembly is engaged and wherein movement of the damper gear along the housing gear is unimpeded by the damper when the damper is disengaged.

11. A slide damper for use with an associated sliding object that is movable between a first position and a second position, comprising:

a housing having a track and including a linear gear extending generally parallel to the track;

a cover configured for movement along the housing, the cover having a damper assembly receiving region and an out-of-round opening formed therein, the cover further including a pin for engaging the housing track as the cover moves along the housing and an engaging element for engaging the associated sliding object;

a spring connecting the cover and the housing to bias the cover to the second position;

a damper assembly includes a damper housing having a geared outer periphery, a damping material disposed in the damper housing and a rotor disposed at least in part within the damper housing for cooperating with the damping material, the rotor having a shaft and being rotatable relative to the damper housing, the damper being disposed within the damper assembly receiving region with the rotor shaft or cap boss extending through the cover opening, the damper assembly being selectively engaged such that rotor rotates relative to the damper housing when the cover is moved toward the second position and disengaged such that the rotor is stationary relative to the damper housing when the cover is moved toward the first position; and a damper gear operably connecting the rotor shaft and the housing gear for rotating the damper shaft as the cover is moved along the housing, wherein movement of the damper gear along the housing gear is dampened when the damper assembly is engaged and wherein movement of the damper gear along the housing gear is unimpeded by the damper when the damper is disengaged, wherein the track has a main portion and a branch portion depending from the main portion, the main portion and branch portion being separated by a flexible finger, and wherein the track engaging pin on the cover is movable generally transverse to the track main portion, against the flexible finger, for engaging the associated sliding object.

12. The slide damper in accordance with claim 10 including a detent at an end of the track configured for securing the cover when the damper is in the second position.

13. The slide damper in accordance with claim 12 wherein the detent is formed at an end of the track opposite of a branch portion.

14. A slide damper for use with an associated sliding object that is engageable with and disengageable from the sliding object, the slide damper movable between a first position and a second position, comprising:

a housing having a slot having a main portion and a branch portion depending from the main portion, the main portion and branch portion being separated by a flexible element;

a cover configured for movement along the housing, the cover having a damper assembly operably connected thereto that is selectively engaged and disengaged so that movement of the cover along the housing is dampened when the damper assembly is engaged and so that movement of the cover along the housing is unimpeded by the damper when the damper is disengaged; and at least one slot pin extending from the cover and into the housing slot for maintaining alignment of the cover within the housing as the cover moves along the housing, the at least one slot pin further configured for engagement with the associated sliding object, wherein when the slide damper is engaged with the sliding object from a disengaged condition, the at least one slot pin is moveable against a flexible element toward the branch portion so that the at least one slot pin moves transverse to the main portion to accommodate movement of the at least one slot pin.

15. The slide damper in accordance with claim 14 including a detent at an end of the slot spaced from the branch portion, the detent being configured for securing the cover when the damper is in the second position.

16. The slide damper in accordance with claim 15 including a first slot pin extending from the cover for traversing in the housing slot, for engaging the detent and for engaging the associated sliding object, and including a second slot pin extending from the cover for traversing in the housing slot.

17. The slide damper in accordance with claim 14 wherein the damper assembly is engaged when the cover is moved along the housing to move the slide damper to the second position and wherein the damper assembly is disengaged when the cover is moved along the housing to move the slide damper to the first position.

18. The slide damper in accordance with claim 14 wherein the damper assembly includes a damper housing and wherein the damper housing is selectively moveable relative to the cover to move the damper housing into engagement with a portion of the cover to engage the damper assembly and out of engagement with a portion of the cover to disengage the damper assembly.

19. The slide damper in accordance with claim 14 including a spring operably connecting the housing and the cover to bias the cover to the second position.

20. The slide damper in accordance with claim 19 wherein the spring is wrapped around a turning element in the housing.

* * * * *